United States Patent
Bulatowicz et al.

(10) Patent No.: US 9,618,362 B2
(45) Date of Patent: Apr. 11, 2017

(54) SELF-CALIBRATING NUCLEAR MAGNETIC RESONANCE (NMR) GYROSCOPE SYSTEM

(71) Applicants: Michael D. Bulatowicz, Canoga Park, CA (US); Michael S. Larsen, Woodland Hills, CA (US)

(72) Inventors: Michael D. Bulatowicz, Canoga Park, CA (US); Michael S. Larsen, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 492 days.

(21) Appl. No.: 14/295,091

(22) Filed: Jun. 3, 2014

(65) Prior Publication Data

US 2016/0202083 A1   Jul. 14, 2016

(51) Int. Cl.
   G01V 3/00      (2006.01)
   G01C 25/00     (2006.01)
   G01C 19/62     (2006.01)

(52) U.S. Cl.
   CPC .......... *G01C 25/00* (2013.01); *G01C 19/62* (2013.01); *G01C 25/005* (2013.01)

(58) Field of Classification Search
   CPC ....... G01C 25/00; G01C 25/005; G01R 33/26
   USPC ........................................... 324/309
   See application file for complete search history.

(56) References Cited

U.S. PATENT DOCUMENTS

| 4,403,190 A | 9/1983 | Greenwood |
| 4,461,996 A | 7/1984 | Kwon |
| 4,825,260 A | 4/1989 | Hendow et al. |
| 6,097,532 A | 8/2000 | Harris et al. |
| 7,728,587 B2 | 6/2010 | Stewart et al. |
| 8,212,556 B1 | 7/2012 | Schwindt et al. |
| 2009/0033329 A1 | 2/2009 | Stewart et al. |
| 2011/0025330 A1* | 2/2011 | Bulatowicz ............ G01C 19/62 324/318 |
| 2013/0095327 A1 | 4/2013 | Vardeny et al. |

(Continued)

FOREIGN PATENT DOCUMENTS

EP       1 847 846 A1    10/2007

OTHER PUBLICATIONS

Extended European Search Report for Application No. 15169150.8 dated Oct. 23, 2015.

*Primary Examiner* — Susan Lee
(74) *Attorney, Agent, or Firm* — Tarolli, Sundheim, Covell & Tummino LLP

(57) ABSTRACT

One embodiment includes a nuclear magnetic resonance (NMR) gyroscope system. The system includes a vapor cell comprising an alkali metal and a plurality of gyromagnetic isotopes and a pump laser configured to generate an optical pump beam configured to spin-polarize the alkali metal. The system also includes a probe laser that generates an optical probe beam and a detection system configured to monitor the optical probe beam and to calculate a rotation of the NMR gyroscope system about a sensitive axis based on a modulation of the optical probe beam in response to precession of the plurality of gyromagnetic isotopes resulting from the spin-polarization of the alkali metal. The system further includes a calibration controller that modulates a characteristic of the optical pump beam to substantially mitigate bias errors associated with the gyromagnetic isotopes in the calculation of the rotation of the NMR gyroscope system about the sensitive axis.

20 Claims, 3 Drawing Sheets

(56) References Cited

U.S. PATENT DOCUMENTS

| | | |
|---|---|---|
| 2013/0213135 A1 | 8/2013 | Compton et al. |
| 2013/0328557 A1* | 12/2013 | Larsen .................. G01R 33/26 324/304 |
| 2015/0241217 A1* | 8/2015 | Bulatowicz ............ G01C 19/60 324/309 |
| 2016/0202062 A1* | 7/2016 | Griffith ................. G01C 19/62 324/304 |

* cited by examiner

SELF-CALIBRATING NUCLEAR MAGNETIC RESONANCE (NMR) GYROSCOPE SYSTEM

TECHNICAL FIELD

The present invention relates generally to sensor systems, and specifically to a self-calibrating nuclear magnetic resonance (NMR) gyroscope system.

BACKGROUND

A typical nuclear magnetic resonance (NMR) gyroscope operates on the principle of sensing inertial angular rotation rate or orientation angle about a sensitive axis based on a shift in the measured Larmor precession frequency or phase of one or two isotopes that possess nuclear magnetic moments. An NMR gyroscope system can include a vapor cell and a rotation sensor that includes, for example, a light source, a photodetector, and signal processing circuitry. As an example, the vapor cell can contain one or more alkali metals, such as rubidium or cesium, together with one or more gyromagnetic isotopes that are caused to precess in response to a magnetic field. The signal processing circuitry can extract the Larmor precession frequency and/or phase information of the one or more gyromagnetic isotopes. As a result, a gyroscope rotation rate or orientation angle about the sensitive axis can be calculated based on the extracted Larmor precession frequencies and phase information.

SUMMARY

One embodiment includes a nuclear magnetic resonance (NMR) gyroscope system. The system includes a vapor cell comprising an alkali metal and a plurality of gyromagnetic isotopes and a pump laser configured to generate an optical pump beam configured to spin-polarize the alkali metal. The system also includes a probe laser that generates an optical probe beam and a detection system configured to monitor the optical probe beam and to calculate a rotation of the NMR gyroscope system about a sensitive axis based on a modulation of the optical probe beam in response to precession of the plurality of gyromagnetic isotopes resulting from the spin-polarization of the alkali metal. The system further includes a calibration controller that modulates a characteristic of the optical pump beam to substantially mitigate bias errors associated with the gyromagnetic isotopes in the calculation of the rotation of the NMR gyroscope system about the sensitive axis.

Another embodiment includes a method for self-calibration of an NMR gyroscope system. The method includes generating an optical pump beam via a pump laser and providing the optical pump beam through a vapor cell comprising an alkali metal and a plurality of gyromagnetic isotopes. The optical pump beam can be provided along a sensitive axis of the NMR gyroscope system to spin-polarize the alkali metal. The method also includes generating an optical probe beam via a probe laser and providing the optical probe beam through the vapor cell orthogonally with respect to the optical pump beam to provide a detection beam exiting the vapor cell. The method also includes modulating a characteristic of the optical pump beam to render bias error corresponding to at least one of isotope shift and quadrupole shift associated with the plurality of gyromagnetic isotopes observable based on a difference in precession of the plurality of gyromagnetic isotopes as provided by the detection beam. The method further includes removing the bias error from a calculation of rotation of the NMR gyroscope system about the sensitive axis.

Another embodiment includes an NMR gyroscope system. The system includes a vapor cell comprising an alkali metal and a plurality of gyromagnetic isotopes and a pump laser configured to generate an optical pump beam having a first linear-polarization. The system also includes a calibration controller. The calibration controller includes a polarization controller configured to modulate the optical pump beam between the first linear-polarization and a second linear-polarization that is orthogonal with respect to the first linear-polarization based on a time modulation signal, and a quarter-wave plate configured to convert the first linear-polarization to a first circular-polarization and to convert the second linear-polarization to a second circular-polarization opposite the first circular-polarization. The modulated circularly-polarized optical pump beam can be provided through the vapor cell along a sensitive axis. The system also includes a probe laser configured to generate an optical probe beam, and a detection system configured to monitor the optical probe beam, to observe bias errors associated with precession of the plurality of gyromagnetic isotopes based on the modulated circularly-polarized optical pump beam, and to calculate a rotation of the NMR gyroscope system about a sensitive axis based on a modulation of the optical probe beam in response to the precession of the plurality of gyromagnetic isotopes and based on the observed bias errors.

DETAILED DESCRIPTION

The present invention relates generally to sensor systems, and specifically to a self-calibrating nuclear magnetic resonance (NMR) gyroscope system. The self-calibrating NMR gyroscope system can include a vapor cell having alkali metal and a plurality of gyromagnetic isotopes. A magnetic field source can generate a substantially uniform magnetic field that is provided through the vapor cell and which is aligned with a sensitive axis of the NMR gyroscope system. A pump laser can generate an optical pump beam that is provided through the vapor cell to spin-polarize the alkali metal, thus facilitating precession of the alkali metal and the gyromagnetic isotopes in response to the magnetic field. As an example, the pump laser can be configured to generate the optical pump beam as a linearly-polarized beam that is circularly-polarized via a quarter-wave plate before being provided through the vapor cell. A probe laser can generate an optical probe beam that can likewise be provided through the vapor cell in a direction that is orthogonal with respect to the optical pump beam, and which exits the vapor cell as a detection beam.

A detection system can be configured to monitor the detection beam to calculate a rotation of the NMR gyroscope system about the sensitive axis. For example, the detection system can be configured to monitor a Faraday rotation of the optical probe beam resulting from a precession of the gyromagnetic isotopes, such that the rotation of the NMR gyroscope system can be calculated based on changes in the Faraday rotation. Additionally, the NMR gyroscope system can include a calibration controller that is configured to modulate a characteristic of the optical pump beam to substantially mitigate bias errors associated with the gyromagnetic isotopes (e.g., isotope shift and/or quadrupole shift) in the calculation of the rotation of the NMR gyroscope system about the sensitive axis. For example, the calibration controller can be configured to modulate a direction of the circular-polarization of the optical pump beam. As a result, the sources of the bias errors (e.g., isotope shift and/or quadrupole shift) can be reversed, and can thus be rendered observable. Accordingly, the detection system can identify the bias errors and substantially mitigate the bias errors in the calculation of the rotation of the NMR gyroscope about the sensitive axis.

Figure 1:
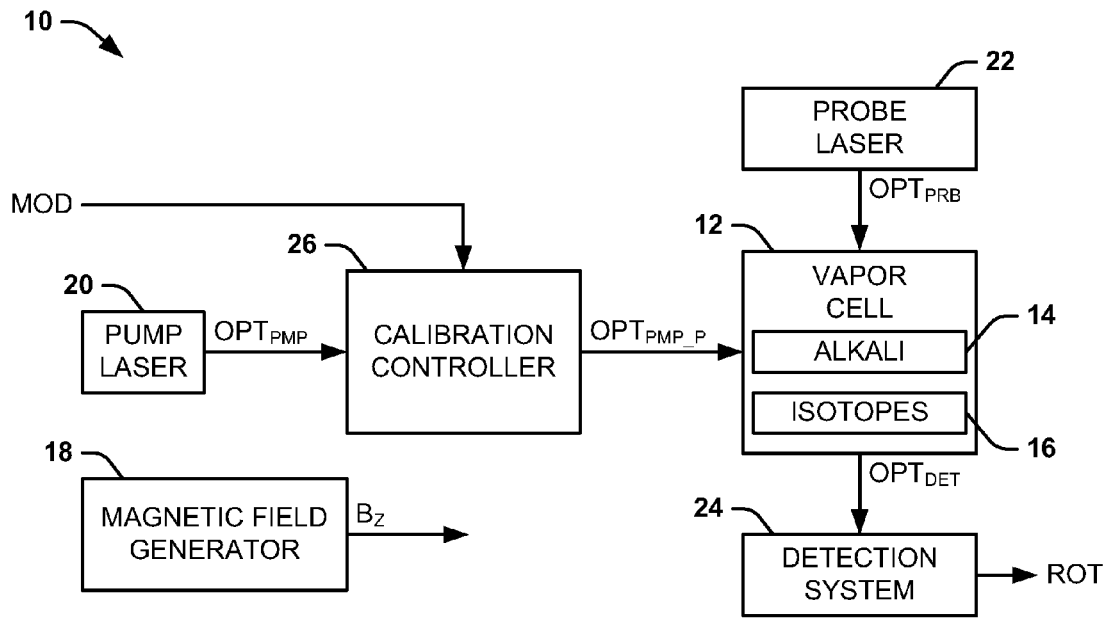
FIG. 1 illustrates an example of a nuclear magnetic resonance (NMR) gyroscope system.

FIG. 1 illustrates an example of a nuclear magnetic resonance (NMR) gyroscope system 10. The NMR gyroscope system 10 can be implemented in any of a variety of applications. As an example, the NMR gyroscope system 10 can be implemented in navigation systems for aircraft and/or spacecraft. In addition, the NMR gyroscope system 10 can be a portion of a multi-axis gyroscope system, such as demonstrated in greater detail in the example of FIG. 4.

The NMR gyroscope system 10 includes a vapor cell 12 that can be, for example, a glass casing of any of a variety of shapes and sizes. The vapor cell 12 includes an alkali metal 14 and a plurality of gyromagnetic isotopes 16. As an example, the alkali metal 14 can be Rubidium (Rb) or Cesium (Cs) vapor, and the gyromagnetic isotopes 16 can include any of a variety of noble gas isotopes, such as $^3$Helium, $^{83}$Krypton, $^{129}$Xenon, and/or $^{131}$Xenon. The NMR gyroscope system 10 also includes a magnetic field source 18 that is configured to generate a net magnetic field $B_Z$ through the vapor cell 12. For example, the magnetic field $B_Z$ can include an AC modulated DC magnetic field, and thus an AC component and a DC component, that is provided through the vapor cell 12 and which is aligned with a sensitive axis of the NMR gyroscope system 10. As an example, the magnetic field source 18 can be configured as a magnetic solenoid that substantially surrounds the vapor cell 12. In addition, the NMR gyroscope system 10 can include a magnetic shield (not shown) that can substantially surround the vapor cell 12, thus substantially mitigating interference from external magnetic fields, such as from the Earth magnetic field.

The NMR sensor system 10 also includes a pump laser 20 configured to generate an optical pump beam $OPT_{PMP}$ and a probe laser 22 configured to generate an optical probe beam $OPT_{PRB}$. The optical pump beam $OPT_{PMP}$ can be generated at a wavelength that can be on-resonance with the alkali metal 14, such as corresponding to either a D1 or a D2 emission line associated with an alkali metal 14. The optical probe beam $OPT_{PRB}$ can be generated at a wavelength that is substantially off-resonance with the alkali metal 14. The optical pump beam $OPT_{PMP}$ is provided through the vapor cell 12, such as along the sensitive axis of the NMR gyroscope system 10. The optical probe beam $OPT_{PRB}$ is likewise provided through the vapor cell 12, in a direction that is orthogonal with respect to the optical pump beam $OPT_{PMP}$, and exits the vapor cell 12 as a detection beam $OPT_{DET}$.

The NMR gyroscope system 10 also includes a detection system 24 that is configured to monitor the detection beam $OPT_{DET}$ to calculate a rotation of the NMR gyroscope system 10 about the sensitive axis. For example, the detection sensor 24 can include a mechanization processor that is configured to calculate the rotation angle about the sensitive axis of the NMR gyroscope system 10 based on the measured precession angle of the gyromagnetic isotopes 16. As an example, the detection sensor 24 can be configured to calculate the rotation angle about the sensitive axis of the vapor cell 12 based on the measured precession angle of the gyromagnetic isotopes 16 that is indicated by the demodulated detection signal $OPT_{DET}$. For example, the detected precession angle of the gyromagnetic isotopes 16 can be compared to a predetermined reference signal corresponding to an expected precession angle of one or more of the gyromagnetic isotopes 16 in the stable magnetic field $B_Z$. Thus, the rotation of the vapor cell 12 can be calculated from a difference (e.g., a phase or frequency difference) between the measured precession angle of the gyromagnetic isotope 16 and the reference signal. In the example of FIG. 1, the calculated rotation is demonstrated as a signal ROT.

In the example of FIG. 1, the NMR gyroscope system 10 also includes a calibration controller 26 that is configured to provide self-calibration of the NMR gyroscope system 10, such that bias errors can be substantially mitigated in the calculation of the rotation ROT about the sensitive axis. As an example, the optical pump beam $OPT_{PMP}$ can be generated by the pump laser 20 at a linear-polarization. The calibration controller 26 can include a quarter-wave plate to circularly-polarize the optical pump beam $OPT_{PMP}$ to provide a circularly-polarized optical pump beam $OPT_{PMP\_P}$, which is provided through the vapor cell 12. The circular-polarization of the optical pump beam $OPT_{PMP\_P}$ can thus spin-polarize the alkali metal 14 based on an angular momentum of the photons therein to facilitate precession of the alkali metal 14.

For example, optical pumping of the gyromagnetic isotopes 16 via spin-exchange involving interaction between the gyromagnetic isotopes 16 and the alkali metal 14 in response to the circularly-polarized optical pump beam $OPT_{PMP\_P}$ can be subjected to measurement drift that can be exhibited as bias errors in the calculated rotation ROT. Primary sources of measurement drift include anything that can change an apparent ratio of gyromagnetic ratios of the gyromagnetic isotopes 16 with respect to each other. The gyromagnetic ratios of the gyromagnetic isotopes 16 can be characterized by a measure of the precession rates of the gyromagnetic isotopes 16 per unit amplitude of the magnetic field $B_Z$. For example, the gyromagnetic isotopes 16 can include two isotopes of Xe (e.g., $^{131}$Xe and $^{129}$Xe). As an example, the measurement drift can include "isotope shift", which can be based on any difference in the manner in which each of the gyromagnetic isotopes 16 interact with the alkali metal 14 (e.g., a relative difference between the interaction of the $^{131}$Xe isotope and the $^{129}$Xe isotope). As another example, the measurement drift can include "quadrupole shift", which can be based on nuclear quadrupole interaction with electric field gradients, such as during the interaction of one of the gyromagnetic isotopes 16 (e.g., the $^{131}$Xe isotope) and a wall of the vapor cell 12. The effects of isotope shift and/or quadrupole shift can contribute a significant amount of bias error in the calculation of the rotation ROT of the NMR gyroscope system 10 about the sensitive axis.

To substantially mitigate the bias errors caused by isotope and/or quadrupole shift, the calibration controller 26 can be configured to modulate a characteristic of the optical pump beam $OPT_{PMP}$ based on a time modulation signal MOD. For example, the calibration controller 26 can be configured to modulate a direction of the circular-polarization of the optical pump beam $OPT_{PMP\_P}$ between a "right-handed" circular-polarization and a "left-handed" circular-polarization. As a first example, the calibration controller 26 can be configured to modulate the stimulation of the pump laser 20 to change the generation of the optical pump beam $OPT_{PMP}$ from a first linear-polarization to a second linear-polarization that is orthogonal with respect to the first linear-polarization. Thus, the first linear-polarization can be converted to a first circular-polarization by the quarter-wave plate and the second linear-polarization can be converted to a second circular-polarization that is opposite the first circular-polarization by the quarter-wave plate. As a second example, calibration controller 26 can include additional optics that can alternately switch the optical pump beam $OPT_{PMP}$ between the first and second linear-polarizations based on the time modulation signal MOD. As a third example, the calibration controller 26 can be configured to alternately rotate the quarter-wave plate by approximately 90° based on the time modulation signal MOD to modulate the circular-polarization of the optical pump beam $OPT_{PMP\_P}$ between the first and second circular-polarizations.

In response to the modulation of the circular-polarization of the optical pump beam $OPT_{PMP\_P}$ between "right-handed" circular-polarization and "left-handed" circular-polarization, the polarization of the gyromagnetic isotopes 16 can be likewise modulated. Therefore, the polarization of the gyromagnetic isotopes 16 can be periodically reversed based on the modulation scheme. As a result, the effects of the isotope and/or quadrupole shifts can likewise be periodically reversed independently of scale factor of the characteristics of the detection beam $OPT_{DET}$ (e.g., as provided by the Faraday rotation). Thus, the bias error resulting from the isotope and/or quadrupole shifts is rendered observable in the detection beam $OPT_{DET}$ by the detection system 24. Accordingly, the detection system 24 can be configured to remove the observable bias error resulting from the isotope and/or quadrupole shifts from the calculation of the rotation ROT of the NMR gyroscope system 10.

In addition to modulating the circular-polarization of the optical pump beam $OPT_{PMP\_P}$ between "right-handed" circular-polarization and "left-handed" circular-polarization, the NMR gyroscope system 10 can be configured to implement any of a variety of other manners of mitigating bias error. For example, the calibration controller 26 can be configured to likewise modulate the DC component of the magnetic field $B_Z$, such as symmetrically about zero. Therefore, the vector direction of the sensitive axis can likewise be modulated to periodically reverse the scale factor of the characteristics of the detection beam $OPT_{DET}$ (e.g., as provided by the Faraday rotation). As an example, the modulation of the DC component of the magnetic field $B_Z$ can be implemented in a manner similar to that described in U.S. Pat. No. 7,728,587, which is incorporated herein by reference in its entirety. Thus, bias error resulting from isotope shift can be more accurately observed and removed from the calculation of the rotation ROT of the NMR gyroscope system 10. The modulation of the DC component of the magnetic field $B_Z$ can be implemented along with the modulation of the circular-polarization direction of the optical pump beam $OPT_{PMP\_P}$, such as in a manner that is time-aligned with respect to each other. Therefore, the calculation of the rotation ROT of the NMR gyroscope 10 about the sensitive axis can be provided in a more accurate manner than modulating the circular-polarization direction of the optical pump beam $OPT_{PMP\_P}$ alone.

Figure 2:
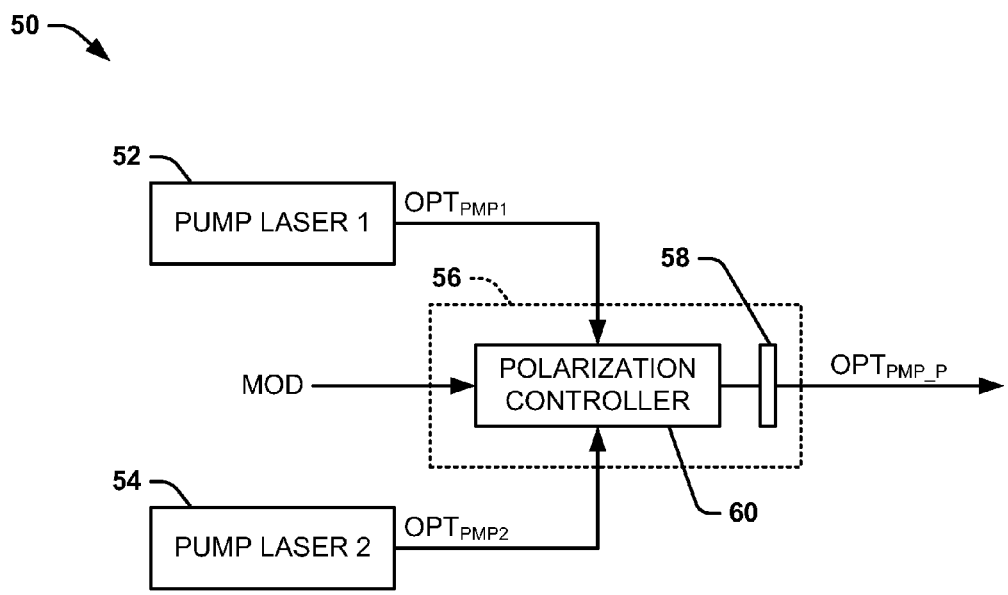
FIG. 2 illustrates another example of an NMR gyroscope system.

FIG. 2 illustrates another example of an NMR gyroscope system 50. The NMR gyroscope system 50 can be a portion of an NMR gyroscope system, such as the NMR gyroscope system 10 in the example of FIG. 1. The NMR gyroscope system 50 can correspond to another example of a manner in which the circular-polarization of the optical pump beam $OPT_{PMP\_P}$ can be modulated between "right-handed" circular-polarization and "left-handed" circular-polarization.

The NMR gyroscope system 50 includes a first pump laser 52 and a second pump laser 54. The first and second pump lasers 52 and 54 can be configured as any of a variety of different types of lasers, such as vertical-cavity surface emitting lasers (VCSELs). The first pump laser 52 can be configured to generate a first optical pump beam $OPT_{PMP1}$ that has a first linear-polarization, and the second pump laser 54 can be configured to generate a second optical pump beam $OPT_{PMP2}$ that has a second linear-polarization that is orthogonal with respect to the first linear-polarization. As an example, the first and second pump lasers 52 and 54 can include respective linear polarizers that are oriented to provide the first and second optical pump beams $OPT_{PMP1}$ and $OPT_{PMP2}$ as having the respective first and second linear-polarizations.

The NMR gyroscope system 50 also includes a calibration controller 56 that receives each of the first optical pump beam $OPT_{PMP1}$ and the second optical pump beam $OPT_{PMP2}$. The calibration controller 56 includes a quarter-wave plate 58 and a polarization controller 60. The polarization controller 60 is configured to alternately provide the first and second optical pump beams $OPT_{PMP1}$ and $OPT_{PMP2}$ along a common optical path to an input of the quarter-wave plate 58 based on the time modulation signal MOD. For example, the polarization controller 60 can include optics that switch between the first and second optical pump beams $OPT_{PMP1}$ and $OPT_{PMP2}$ based on the time modulation signal MOD to respectively alternate between the first linear-polarization and the second linear-polarization at the input of the quarter-wave plate 58. As a result, the circularly-polarized optical pump beam $OPT_{PMP\_P}$ that is provided from the quarter-wave plate 58 can be modulated between the "right-handed" circular-polarization and the "left-handed" circular-polarization.

Figure 3:
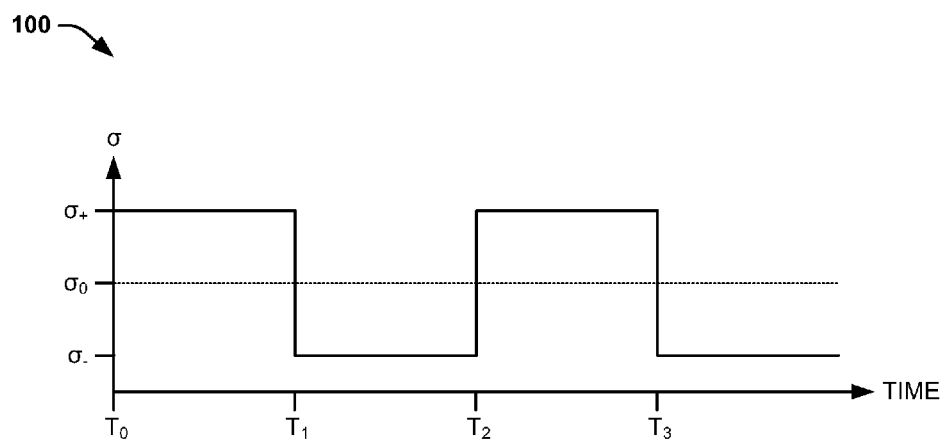
FIG. 3 illustrates an example of a timing diagram.

FIG. 3 illustrates an example of a timing diagram 100. The timing diagram 100 can correspond to the circular-polarization of the optical pump beam $OPT_{PMP\_P}$, demonstrated in the example of FIG. 3 as σ, as a function of time. Because the timing diagram 100 can correspond to the optical pump beam $OPT_{PMP\_P}$ in the examples of FIGS. 1 and 2, reference is to be made to the examples of FIGS. 1 and 2 in the following description of the example of FIG. 3.

At a time $T_0$, the optical pump beam $OPT_{PMP\_P}$ has a circular-polarization that is demonstrated as $\sigma_+$, which can correspond to a "right-handed" direction of circular-polarization. As an example, the circular-polarization $\sigma_+$ can result from the first linear-polarization being provided to the quarter-wave plate 58. Thus, at the time $T_0$, the optical pump beam $OPT_{PMP\_P}$ provides spin-polarization of the alkali metal 14 in the vapor cell 12, and thus precession of the alkali metal 14 at a first resonant frequency based on the magnetic field $B_Z$, the polarization of the gyromagnetic isotopes 16, and a small contribution from self-magnetization of the alkali metal 14, therefore resulting in a precession of the gyromagnetic isotopes 16 based on the associated spin-exchange process.

At a time $T_1$, the circular-polarization of the optical pump beam $OPT_{PMP\_P}$ switches from the circular-polarization $\sigma_+$ to the circular-polarization $\sigma_-$, which is opposite a polarization $\sigma_0$ that can correspond to no circular-polarization. Therefore, the circular-polarization $\sigma_-$ can correspond to a "left-handed" direction of circular-polarization. As an example, the circular-polarization $\sigma_-$ can result from the second linear-polarization being provided to the quarter-wave plate 58, such as based on the polarization controller 60 switching from the first optical pump beam $OPT_{PMP1}$ to the second optical pump beam $OPT_{PMP2}$ being provided in the optical path to the quarter-wave plate 58 based on the time modulation signal MOD. Thus, at the time $T_1$, the optical pump beam $OPT_{PMP\_P}$ provides spin-polarization of the alkali metal 14 in the vapor cell 12 in the opposite direction, and thus precession of the alkali metal 14 at a second resonant frequency based on the magnetic field $B_Z$, an opposite polarization of the gyromagnetic isotopes 16, and an opposite small contribution from self-magnetization of the alkali metal 14

Furthermore, at the time $T_1$, the resonant frequency of the gyromagnetic isotopes 16 is shifted relative to the resonant frequency of the gyromagnetic isotopes 16 at the time $T_0$. As a result, the effects of the isotope and/or quadrupole shifts associated with the gyromagnetic isotopes 16 are reversed independently of scale factor of the characteristics of the detection beam $OPT_{DET}$ (e.g., as provided by the Faraday rotation). Thus, the bias error resulting from the isotope and/or quadrupole shifts is rendered observable in the detection beam $OPT_{DET}$ by the detection system 24. Accordingly, the detection system 24 can calculate the rotation ROT of the NMR gyroscope system 10 in a manner such that the observable bias error resulting from the isotope and/or quadrupole shifts is removed based on the characteristics of the detection beam $OPT_{DET}$ at the time $T_1$ relative to the time $T_0$. At a time $T_2$, the optical pump beam $OPT_{PMP\_P}$ switches back to the circular-polarization $\sigma_+$, and at a subsequent time $T_3$, the optical pump beam $OPT_{PMP\_P}$ switches back to the circular-polarization $\sigma_-$. The time intervals between the time $T_0$ and $T_1$, between the time $T_1$ and $T_2$, and between the time $T_2$ and $T_3$ can be approximately equal. Therefore, the time modulation signal MOD can be provided to modulate the circular-polarization direction of the optical pump beam $OPT_{PMP\_P}$ at substantially equal time periods.

Figure 4:
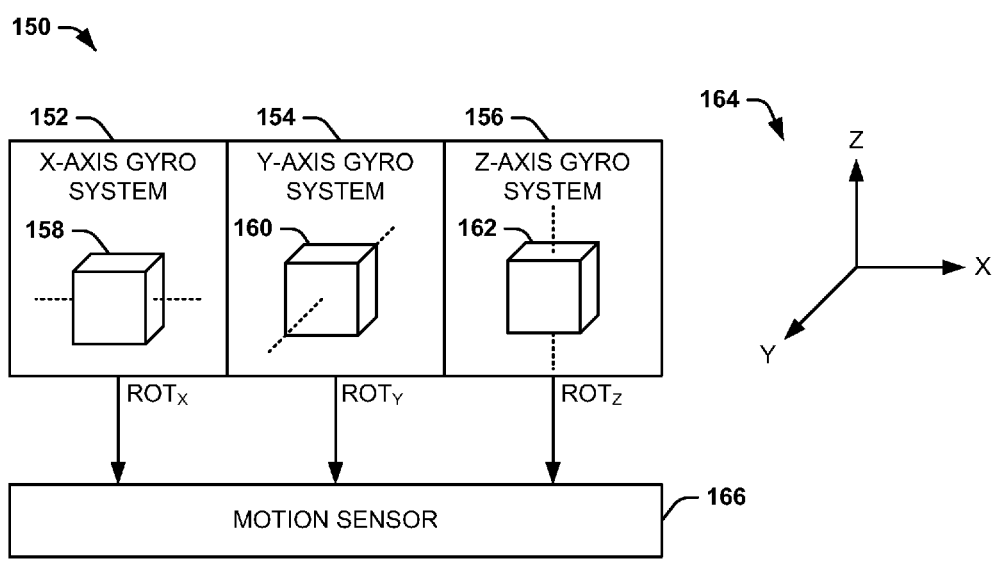
FIG. 4 illustrates an example of a three-axis gyroscope system.

FIG. 4 illustrates an example of a three-axis gyroscope system 150 in accordance with an aspect of the invention. As an example, the three-axis gyroscope system 150 can be implemented in any of a variety of navigation control systems, such as for aircraft and/or spacecraft, or device to monitor yaw, pitch, and roll rotational motion information.

The three-axis gyroscope system 150 includes an X-axis gyroscope system 152, a Y-axis gyroscope system 154, and a Z-axis gyroscope system 156. In the example of FIG. 4, the X-axis gyroscope system 152 can have a sensitive axis about the X-axis, the Y-axis gyroscope system 154 can have a sensitive axis about the Y-axis, and the Z-axis gyroscope system 156 can have a sensitive axis about the Z-axis. The axes of rotation of the respective NMR vapor cells 158, 160, and 162 are indicated in the example of FIG. 4 by a Cartesian coordinate system 164. As an example, each of the X-axis, Y-axis, and Z-axis gyroscope systems 152, 154, and 156 can be configured substantially similar to the NMR gyroscope system 10 in the example of FIG. 1. Thus, each of X-axis, Y-axis, and Z-axis gyroscope systems 152, 154, and 156 can be configured to determine respective rotation angles $ROT_X$, $ROT_Y$, and $ROT_Z$ about each of the respective X, Y, and Z axes based on respective detection beams $OPT_{DET}$ that are provided through each of the respective vapor cells 158, 160, and 162 in response to respective optical pump beams $OPT_{PMP\_P}$ that are each modulated (e.g., with respect to circular-polarization direction) to polarize alkali metal to facilitate precession of the respective alkali metal and gyromagnetic isotopes therein. As an example, the modulation of the respective optical pump beams $OPT_{PMP\_P}$ through each of the respective vapor cells 158, 160, and 162 can be substantially time-aligned, such as based on a common time modulation signal MOD.

In the example of FIG. 4, each of the X-axis, Y-axis, and Z-axis gyroscope systems 152, 154, and 156 are demonstrated as outputting signals that include the respective rotation angles $ROT_X$, $ROT_Y$, and $ROT_Z$ to a motion sensor 166. The motion sensor 166 can thus be configured to determine an aggregate three-axis rotational motion of the associated vehicle or device that includes the three-axis gyroscope system 150. Therefore, the yaw, pitch, and roll of the associated vehicle or device that includes the three-axis gyroscope system 150 can be determined. Accordingly, the motion sensor 166 can be configured to display, output, and/or report the three-axis rotational motion of the associated vehicle or device that includes the three-axis gyroscope system 150.

Figure 5:
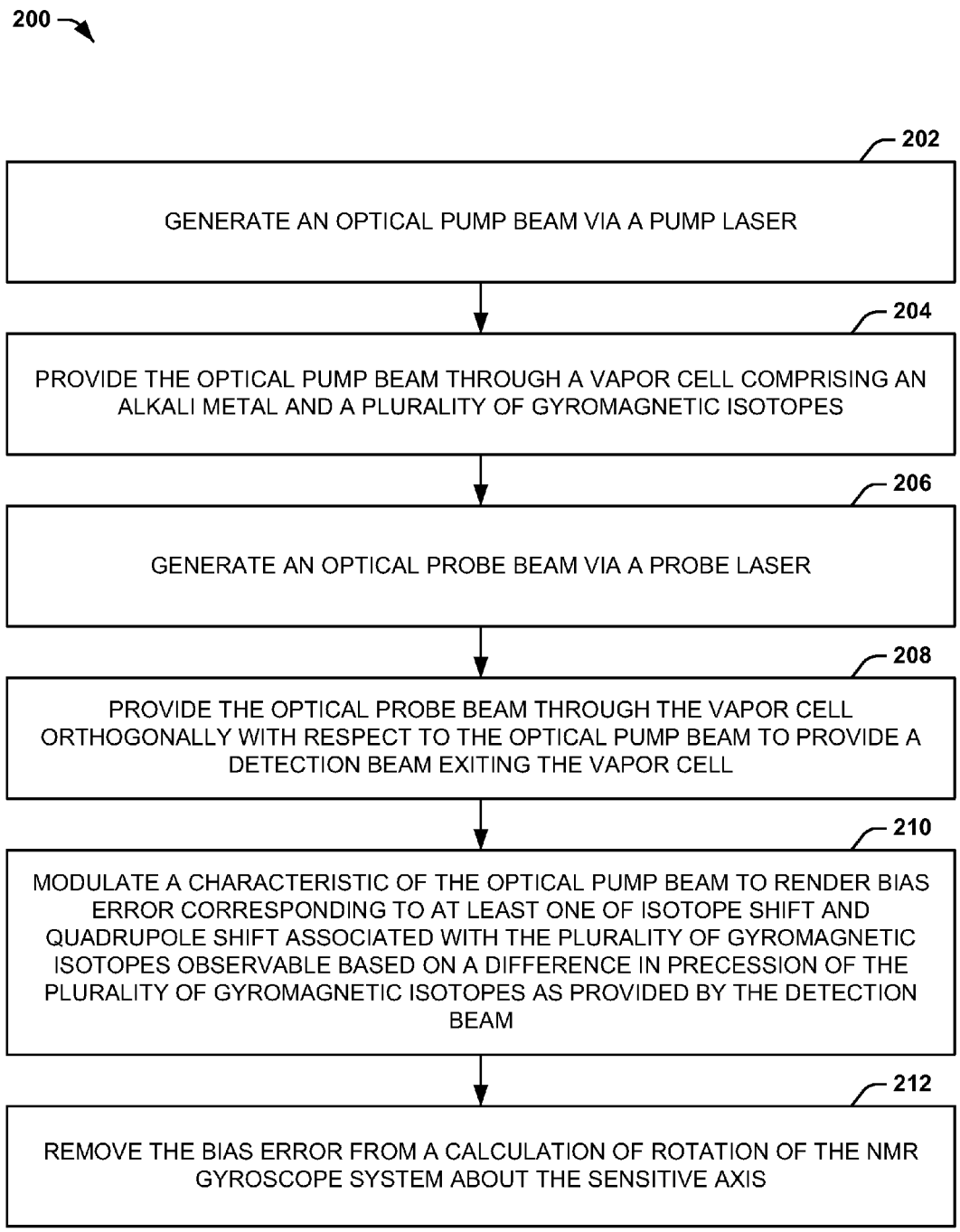
FIG. 5 illustrates an example of a method for self-calibration of an NMR gyroscope system.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for calibrating an NMR gyroscope system (e.g., the NMR gyroscope system 10). At 202, an optical pump beam (e.g., the optical pump beam $OPT_{PMP}$) is generated via a pump laser (e.g., the pump laser 20). At 204, the optical pump beam is provided through a vapor cell (e.g., the vapor cell 12) comprising an alkali metal (e.g., the alkali metal 14) and a plurality of gyromagnetic isotopes (e.g., the gyromagnetic isotopes 16). The optical pump beam can be provided along a sensitive axis of the NMR gyroscope system to spin-polarize the alkali metal. At 206, an optical probe beam (e.g., the optical probe beam $OPT_{PRB}$) is generated via a probe laser (e.g., the probe laser 22). At 208, the optical probe beam is provided through the vapor cell orthogonally with respect to the optical pump beam to provide a detection beam (e.g., the detection beam $OPT_{DET}$) exiting the vapor cell. At 210, a characteristic (e.g., the circular-polarization direction) of the optical pump beam is modulated to render bias error corresponding to at least one of isotope shift and quadrupole shift associated with the plurality of gyromagnetic isotopes observable based on a difference in precession of the plurality of gyromagnetic isotopes as provided by the detection beam. At 212, the bias error is removed from a calculation of rotation (e.g., the rotation ROT) of the NMR gyroscope system about the sensitive axis.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A nuclear magnetic resonance (NMR) gyroscope system comprising:
   a vapor cell comprising an alkali metal and a plurality of gyromagnetic isotopes;
   a pump laser configured to generate an optical pump beam configured to spin-polarize the alkali metal;
   a probe laser configured to generate an optical probe beam;
   a detection system configured to monitor the optical probe beam and to calculate a rotation of the NMR gyroscope system about a sensitive axis based on a modulation of the optical probe beam in response to precession of the plurality of gyromagnetic isotopes resulting from the spin-polarization of the alkali metal; and
   a calibration controller configured to modulate a characteristic of the optical pump beam to substantially mitigate bias errors associated with the gyromagnetic isotopes in the calculation of the rotation of the NMR gyroscope system about the sensitive axis.

2. The system of claim 1, wherein the calibration controller is configured to modulate a circular-polarization of the optical pump beam to substantially mitigate the bias errors associated with the gyromagnetic isotopes in the calculation of the rotation of the NMR gyroscope system about the sensitive axis.

3. The system of claim 1, further comprising a magnetic field generator configured to generate a magnetic field that is substantially aligned with the sensitive axis, the magnetic field comprising a DC component and an AC component.

4. The system of claim 3, wherein the calibration controller is further configured to modulate the DC component of the magnetic field to substantially mitigate bias errors associated with the gyromagnetic isotopes in the calculation of the rotation of the NMR gyroscope system about the sensitive axis.

5. The system of claim 4, wherein the calibration controller is configured to time-align the modulation of the optical pump beam and the DC component of the magnetic field.

6. The system of claim 1, wherein the pump laser is configured to generate the optical pump beam in a first linear-polarization, wherein the calibration controller comprises:
   a polarization controller configured to modulate the optical pump beam between the first linear-polarization and a second linear-polarization that is orthogonal with respect to the first linear-polarization based on a time modulation signal; and
   a quarter-wave plate configured to convert the first linear-polarization to a first circular-polarization and to convert the second linear-polarization to a second circular-polarization opposite the first circular-polarization.

7. The system of claim 6, wherein the pump laser is a first pump laser configured to generate a first optical pump beam having the first linear-polarization, the system further comprising a second pump laser configured to generate a second optical pump beam having the second linear-polarization, wherein the polarization controller is configured to alternately provide the first and second optical pump beams along a common optical path to an input of the quarter-wave plate based on the time modulation signal.

8. The system of claim 6, wherein the polarization controller is configured to stimulate the pump laser to modulate the optical pump beam generated by the pump laser between the first and second linear-polarizations based on the time modulation signal.

9. The system of claim 6, wherein the polarization controller comprises optics that alternately switch the optical pump beam between the first and second linear-polarizations based on the time modulation signal.

10. The system of claim 6, wherein the polarization controller is configured to alternately rotate the quarter-wave plate by approximately 90° based on the time modulation signal to modulate the circular-polarization between the first and second circular-polarizations.

11. A method for self-calibration of a nuclear magnetic resonance (NMR) gyroscope system, the method comprising:
    generating an optical pump beam via a pump laser;
    providing the optical pump beam through a vapor cell comprising an alkali metal and a plurality of gyromagnetic isotopes, the optical pump beam being provided along a sensitive axis of the NMR gyroscope system to spin-polarize the alkali metal;
    generating an optical probe beam via a probe laser;
    providing the optical probe beam through the vapor cell orthogonally with respect to the optical pump beam to provide a detection beam exiting the vapor cell;
    modulating a characteristic of the optical pump beam to render bias error corresponding to at least one of isotope shift and quadrupole shift associated with the plurality of gyromagnetic isotopes observable based on a difference in precession of the plurality of gyromagnetic isotopes as provided by the detection beam; and
    removing the bias error from a calculation of rotation of the NMR gyroscope system about the sensitive axis.

12. The method of claim 11, wherein modulating the characteristic of the optical pump beam comprises modulating a circular-polarization direction of the optical pump beam.

13. The method of claim 12, wherein generating the optical pump beam comprises generating a first optical pump beam having a first linear-polarization via a first pump laser and generating a second optical pump beam having a second linear-polarization via a second pump laser, wherein modulating the circular-polarization direction of the optical pump beam comprises alternately providing the first and second optical pump beams along a common optical path to an input of a quarter-wave plate based on a time modulation signal.

14. The method of claim 11, further comprising:
    generating a magnetic field that is substantially aligned with the sensitive axis, the magnetic field comprising a DC component and an AC component; and
    modulating the DC component of the magnetic field to render bias error associated with the isotope shift associated with the plurality of gyromagnetic isotopes observable.

15. The method of claim 14, further comprising time-aligning the modulation of the optical pump beam and the DC component of the magnetic field.

16. A nuclear magnetic resonance (NMR) gyroscope system comprising:
    a vapor cell comprising an alkali metal and a plurality of gyromagnetic isotopes;
    a pump laser configured to generate an optical pump beam having a first linear-polarization;
    a calibration controller comprising:
        a polarization controller configured to modulate the optical pump beam between the first linear-polarization and a second linear-polarization that is orthogonal with respect to the first linear-polarization based on a time modulation signal; and a quarter-wave plate configured to convert the first linear-polarization to a first circular-polarization and to convert the second linear-polarization to a second circular-polarization opposite the first circular-polarization, the modulated circularly-polarized optical pump beam being provided through the vapor cell along a sensitive axis;

a probe laser configured to generate an optical probe beam; and a detection system configured to monitor the optical probe beam, to observe bias errors associated with precession of the plurality of gyromagnetic isotopes based on the modulated circularly-polarized optical pump beam, and to calculate a rotation of the NMR gyroscope system about a sensitive axis based on a modulation of the optical probe beam in response to the precession of the plurality of gyromagnetic isotopes and based on the observed bias errors.

17. The system of claim 16, wherein the pump laser is a first pump laser configured to generate a first optical pump beam having the first linear-polarization, the system further comprising a second pump laser configured to generate a second optical pump beam having the second linear-polarization, wherein the polarization controller is configured to alternately provide the first and second optical pump beams along a common optical path to an input of the quarter-wave plate based on the time modulation signal.

18. The system of claim 16, wherein the polarization controller is configured to stimulate the pump laser to modulate the optical pump beam generated by the pump laser between the first and second linear-polarizations based on the time modulation signal.

19. The system of claim 16, wherein the polarization controller comprises optics that alternately switch the optical pump beam between the first and second linear-polarizations based on the time modulation signal.

20. The system of claim 16, wherein the polarization controller is configured to alternately rotate the quarter-wave plate by approximately 90° based on the time modulation signal to modulate the circular-polarization between the first and second circular-polarizations.

* * * * *